United States Patent [19]
Randall

[11] Patent Number: 5,812,790
[45] Date of Patent: Sep. 22, 1998

[54] VARIABLE ENCODING RATE PLAN GENERATION

[75] Inventor: Bruce William Randall, Tiburon, Calif.

[73] Assignee: Sonic Solutions, Novato, Calif.

[21] Appl. No.: 709,575

[22] Filed: Sep. 9, 1996

[51] Int. Cl.$^6$ .................................................. H04N 1/413
[52] U.S. Cl. .............................. 395/200.77; 395/200.61; 348/403; 348/387
[58] Field of Search ................. 364/715.02; 395/200.77, 395/200.32, 200.61, 200.63, 200.64; 348/403, 406, 387, 390; 358/412, 426, 261.2, 430

[56] References Cited

U.S. PATENT DOCUMENTS

| | | | |
|---|---|---|---|
| 5,463,565 | 10/1995 | Cookson et al. | 395/440 |
| 5,650,860 | 7/1997 | Uz | 358/430 |

OTHER PUBLICATIONS

Chad Fogg, "*MPEG–2 FAQ*," Version 3.8, Apr. 2, 1996, at http://www.bmrc.berkeley.edu/projects/mpeg/faq/MPEG–2FAQ.html, pp. 1 to 48.

*Primary Examiner*—Thomas Peeso
*Attorney, Agent, or Firm*—Townsend and Townsend and Crew LLP

[57] ABSTRACT

A profile of information flow rate of a source data stream having inherently variable information flow rate may be developed and conformed to a constrained target profile of output bit rate as would be generated by a variable compression ratio encoding scheme to be applied to the source data stream. The target profile may be constrained as to minimum output bit rate, maximum output bit rate, and average output bit rate. The resulting conforming profile identifies an encoding plan for the source data stream. One application is preparation of video material for storage on a DVD (Digital Versatile Disc) where total bit storage capacity is limited, the source data stream is an uncompressed video data stream, and the target encoding scheme is MPEG-2 data compression.

24 Claims, 5 Drawing Sheets

VARIABLE ENCODING RATE PLAN GENERATION

BACKGROUND OF THE INVENTION

The present invention relates to data compression and more particularly to a method and system for developing an encoding rate profile for a variable information flow rate source data stream.

The emergence of DVD, Digital Versatile Disc, is expected to introduce a new era of video entertainment and, for the first time, bring a digital video format to the consumer market. DVD, while having the same size as a conventional compact disc (CD), is expected to be able to store up to 4.7 Gigabytes (GB) of data on a disc. The DVD standard envisions interactivity as well as multiple language sound tracks and subtitles.

The storage capacity of DVD, while a significant improvement over the prior art, is still insufficient to store a full length feature movie in uncompressed form. The picture storage requirements for precompressed CCIR-601 component digital video are roughly 20 Megabytes per second (Mbps). For a 130 minute movie, this would require 156 Gigabytes of uncompressed storage space, not taking into account storage of audio information. With a DVD disc capable of storing 4.7 Gigabytes of data, compression ratios of roughly 33.2:1 are required in order to fit the video for a feature film along with the audio and sub-titles on a single-sided disc. To address this compression problem, the Motion Picture Experts Group has developed MPEG-2 video compression. The MPEG data compression scheme is based on the principle that temporal and spatial redundancy in motion pictures make up the majority of the visual information that humans perceive. By comparing changes from frame to frame and removing as much of the "same" information as possible, data storage and transfer requirements are reduced. An MPEG-2 stream includes of I-Pictures, B-Pictures, and P-Pictures:

- I-Pictures—Intra-pictures are single compressed pictures which contain all of the spatial information of a video picture.
- P-Pictures—Predictive pictures are computed based on the nearest previous I or P picture. P pictures are more highly compressed than I pictures and provide a reference for the calculation of B pictures.
- B-Pictures—Bi-directional pictures use both past and subsequent pictures as a reference to calculate the compressed picture data.

A standard sequence of I-B-B-P-B-B-P-B-B-P-B-B-P-B-B -I would have a Group of Picture (G.O.P.) of 15, with 15 representing the interval at which I-Pictures repeat. I-Pictures are the building block of the MPEG-2 sequence. B and P pictures are based on the notion that the video sequence will not change drastically between I pictures, which would impair the B and P pictures from accurately representing the motion of pixel information from one I picture to the next. In video production, however, rapid scene changes and excessive motion can have serious negative impacts on the quality of the video. Thus, the sequence of I-B-P pictures must often be modified. This is often done by adding I-Pictures. I-Picture "forcing", as this process is known, is usually done on scene cuts. In this way, each new scene can start with a fresh I-picture which is then used for the calculation of subsequent B and P pictures.

Variable Bit Rate MPEG-2 Encoding is a scaleable compression scheme in that the bit rate (for Main Profile at Main Level (MP@ML)) may vary between a low of 1.0 Mbps and a high of 15 Mbps. Higher bit rates mean more bits are allocated per picture which can result in better looking images. Additionally, the group of pictures (GOP) sequence may be varied from a GOP of 1, I-picture only, to a GOP of 15 or more. The lower the GOP, the closer the location of I-pictures and the higher the relative bit-rate. By definition, I-pictures contain much more information than P and B pictures. As I-pictures are inserted into the picture sequence, the data requirements and the bit-rate for MPEG video increase.

In order to place a 130-minute movie onto a single-sided 4.7 Gigabyte disc, the average MPEG-2 video bit rate must be kept as close to 3.5 Mbps as possible. By allowing for bursts of up to 10 Mbps, the DVD specification takes into account the need for short bursts in the data rate to accommodate complex scenes where additional I-pictures or higher overall bit allocation are necessary to prevent visible compression artifacts.

Part of the DVD production process thus involves optimally allocating a finite "bit budget" over the length of a movie. The optimal allocation will in part depend on subjective judgements of picture quality. Once developed, an allocation plan must specify how the MPEG-2 compression ratio is to be controlled over time and where in the program material additional I-pictures are to be inserted. Unfortunately, convenient tools for performing this allocation are not yet available.

SUMMARY OF THE INVENTION

In accordance with the present invention, a profile of information flow rate of a source data stream having inherently variable information flow rate may be developed and conformed to a constrained target profile of output bit rate as would be generated by a variable compression ratio encoding scheme to be applied to the source data stream. The target profile may be constrained as to minimum output bit rate, maximum output bit rate, and average output bit rate. The resulting conforming profile may identify an encoding plan for the source data stream.

Certain embodiments of the present invention are suitable for application in preparing video material for storage on a DVD (Digital Versatile Disc) where total bit storage capacity is limited, the source data stream is an uncompressed video data stream, and the target encoding scheme is MPEG-2 data compression. Feeding the source data stream through an MPEG-2 encoder while disabling an adaptive bit rate control of the encoder forces the output bit rate of the encoder to represent the information flow rate of the source. In this way, the information flow rate profile of the source may be captured and displayed.

A user interface facilitates refinement of the information flow rate profile to conform to the constraints of the target profile of output bit rate. Furthermore, insertion where desired of extra I-pictures may be directed. I-pictures are MPEG-2 encoder output pictures that incorporate all the spatial information of a video picture as distinguished from B-pictures or P-pictures which describe a video frame by comparison to I-pictures. The goal is a conforming profile and a list of I-picture insertion points that will serve as the basis for controlling the MPEG-2 encoder while it generates the encoded representation of the source data stream for storage on the DVD.

An encoding plan development system according to the present invention is thus a powerful and convenient tool in preparing video material for storage on a DVD. The user may assure that encoder output will satisfy the DVD capacity constraints while retaining the ability to adjust picture quality where needed. The encoding plan development system of the present invention is not however limited to DVD applications or to video.

A further understanding of the nature and advantages of the inventions herein may be realized by reference to the remaining portions of the specification and the attached drawings.

DESCRIPTION OF SPECIFIC EMBODIMENTS

One aspect of the present invention provides a system and method for developing an encoding plan for a source data stream with an inherently variable flow information rate. The encoding plan specifies control of encoder parameters that affect the encoder's output bit rate. One particular application is preparation of video material for storage on a DVD (Digital Versatile Disc). The following description will be primarily directed toward this application. However, the present invention is not limited to DVD or to preparation of video material.

Figure 1:
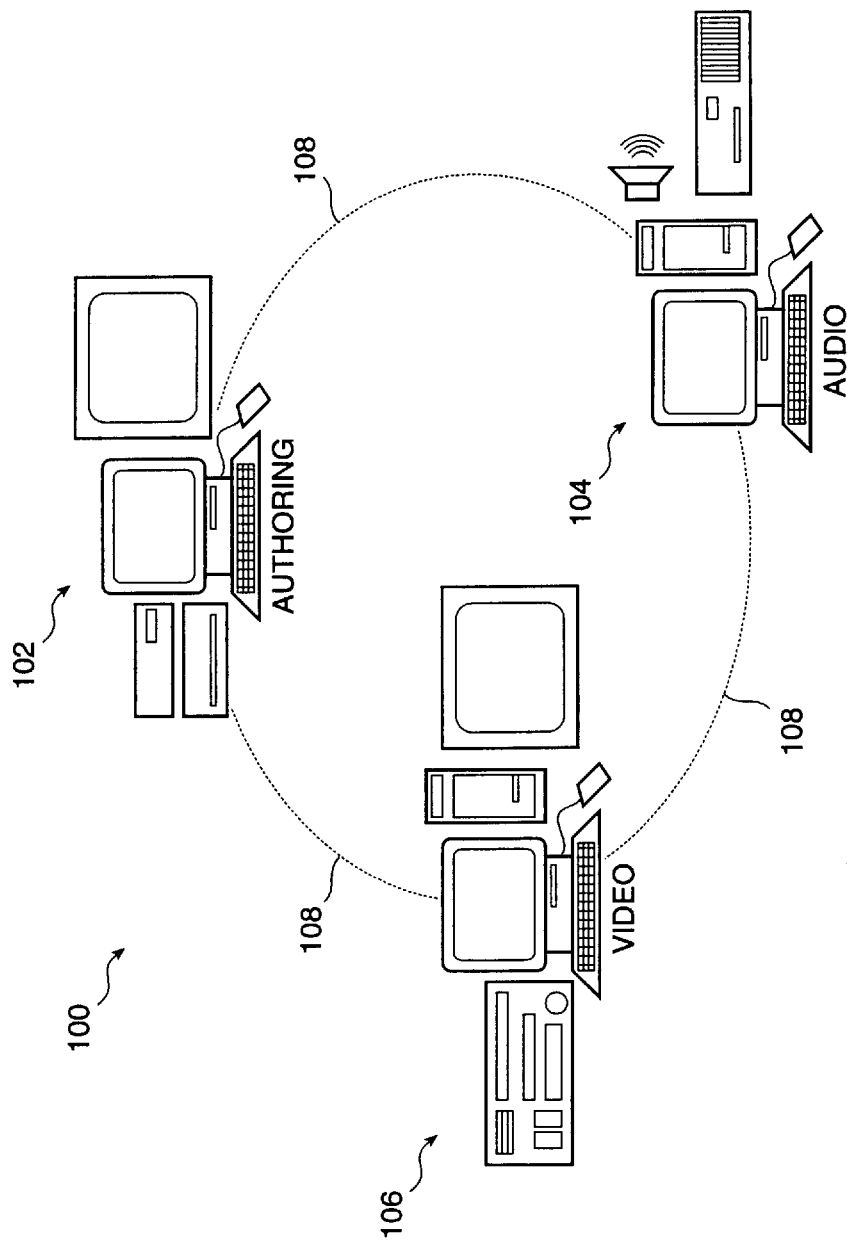
FIG. 1 depicts a DVD networked production environment in accordance with one embodiment of the present invention.

FIG. 1 depicts a DVD networked production environment 100 in accordance with one embodiment of the present invention. DVD networked production environment 100 includes an authoring station 102, an audio material preparation station 104, and a video material preparation station 106. A network 108 interconnects stations in the environment. The job of production environment 100 is to convert video and audio material into a DVD disk image. The various stations may be implemented as, for example, UNIX systems, Windows systems, or Macintosh systems. The arrangement of FIG. 1 is merely representative. Production may be expedited by adding additional stations to perform functions parallel to the depicted stations. Alternatively, the functionality of the three depicted stations could be consolidated into two stations or even one station.

The functions of authoring station 102 include laying out of multiple language tracks, generation of subtitles, creation of menu pages, parental lock-out features, and design of interactive features of the DVD. These authoring functions are not important to the present invention and are not described further herein. A user operating authoring station 102 will also perform overall bit budget allocation for the DVD, allocating available storage space among soundtracks, video material, and interactivity features. Video material is divided into one or more subprojects. The user will typically allocate a bit budget for each subproject. Authoring station 102 outputs a list of subproject segments with their start times, end times, and bit budgets to video material preparation station 106. Each bit budget specifies a maximum bit rate, a minimum bit rate, and an average bit rate for the section. Authoring station 102 may also specify the artistic importance of maintaining video quality for different sections of the subproject by assigning criticality values to each section.

The primary audio format in North America and Japan for DVD is the AC-3 standard, both stereo and 5.1 surround. The production and distribution could likewise be in Stereo PCM as an alternative. DVD permits multiple language tracks. Audio material preparation station 104 converts the audio material to the chosen format. Another function of audio material preparation station is comparison of separate language versions for level, mix, and equalization to assure that audio parameters do not vary between language tracks. The functions of audio material preparation station 104 are also not important to the present invention. Once the audio material is prepared, it is forwarded to authoring station 102 for inclusion in the disk image.

Video material preparation station 106 converts source video material, in uncompressed CCIR-601 component video format, to MPEG-2 compressed digital video data. The input to video material preparation station 106 includes the video program material to be included on the DVD and the list of video subprojects and bit allocations generated by authoring station 102. Criticality values as discussed above may also be part of the input to video material preparation station 106. Several processing steps precede the actual encoding of the video source material.

One pre-encoding step is application of a digital noise reducer or low pass filter to the uncompressed video stream. The filtered video stream includes less random information and is thus easier to compress without loss of picture quality.

Another pre-encoding step is removal of frame redundancy previously introduced by the process of converting film to 525/60 CCIR component video signal from which the CCIR-601 data can be extracted. This conversion process, known as telecine, involves adding redundant frames to match the frame rates between film and 525/60 component video. In this way, 24 frame per second film is converted to 29.97 frames-per-second video. However, MPEG-2 video data may be decoded into a 29.97 frames-per-second decompressed video stream even if the encoded material was 24 frames-per-second. Thus, a pre-encoding step of removing the redundant frames inserted in the telecine process makes does not affect the video compatibility of the decoder output. This step, known as inverse telecine, eliminates redundant fields, allowing the compression system to allocate more bits to the remaining unique frames.

In accordance with the present invention, video material preparation station 106 develops an MPEG-2 encoding plan for each video section on the list generated by authoring station 102. The encoding plan specifies how control parameters of an MPEG2 encoder are to be varied while the source data stream for the video section is encoded. One parameter specified by the encoding plan is an adaptive bit rate control which varies the compression ratio of the MPEG-2 encoder. Another specified parameter is a list indicating where I-pictures are to be forced into the encoder output stream to improve picture quality.

Once pre-encoding steps are complete, video material preparation station 106 converts the video source material to its encoded representation in accordance with the developed encoding plan. The encoded video stream is then sent to authoring station 106 for inclusion in the disk image.

Figure 2:
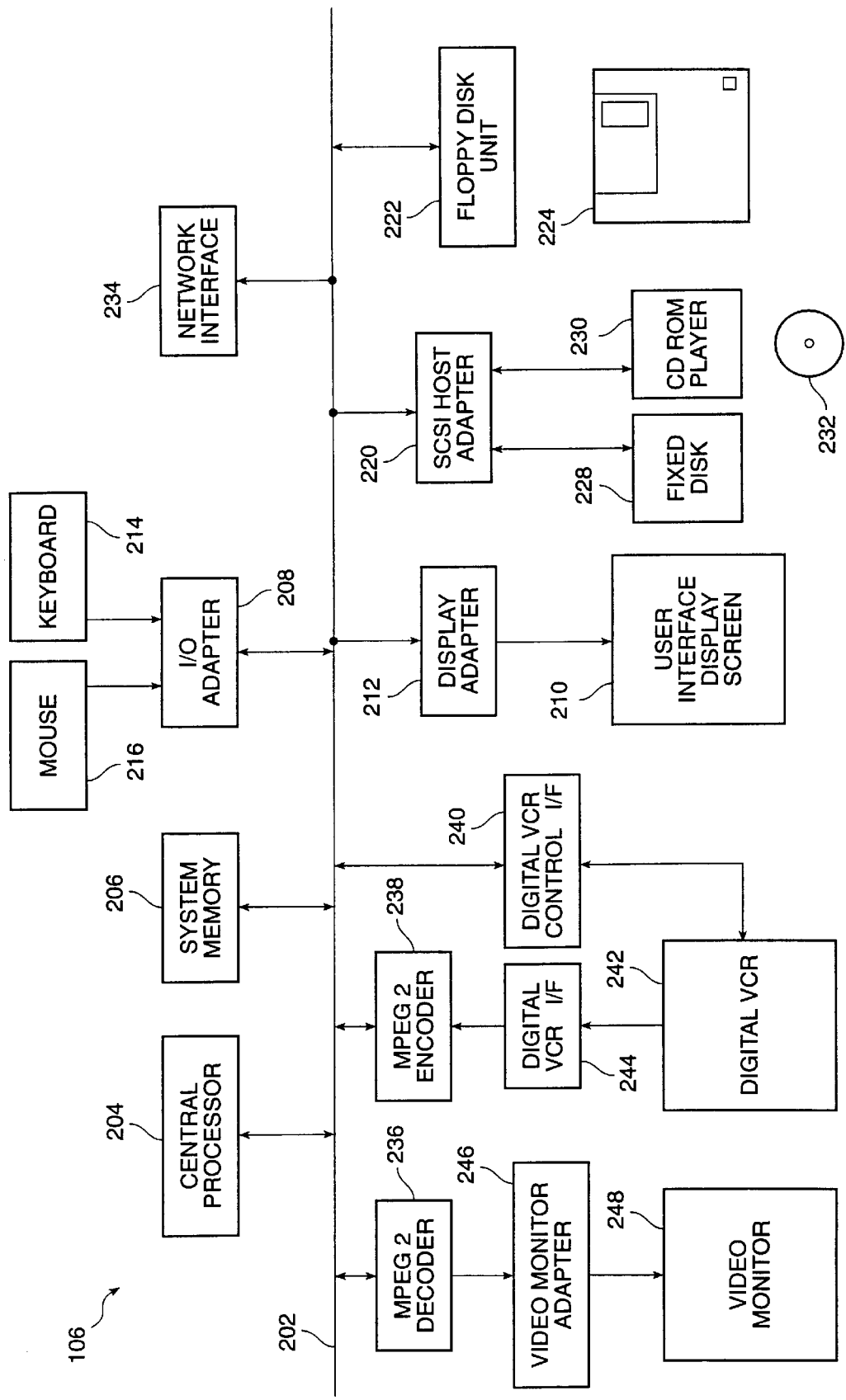
FIG. 2 depicts a video compression workstation in accordance with one embodiment of the present invention.

FIG. 2 depicts components of video material preparation station 106 in accordance with one embodiment of the present invention. Video material preparation station 106 includes a bus 202 which interconnects major subsystems such as a central processor 204, a system memory 206 (typically RAM), an input/output (I/O) adapter 208, a user interface display screen 210 via display adapter 212, a keyboard 214 and mouse 216 via I/O adapter 208, a SCSI host adapter 220, and a floppy disk drive 222 operative to receive a floppy disk 224. SCSI host adapter 220 may act as a storage interface to a fixed disk drive 228 or a CD-ROM player 230 operative to receive a CD-ROM 232. Fixed disk 228 may be a part of video material preparation station 106 or may be separate and accessed through other interface systems. A network interface 234 provides a connection to the other stations of DVD production environment 100 via network 108.

Other components of video material preparation station 106 directly relate to video processing. An MPEG-2 decoder 236 and an MPEG-2 encoder 238 are coupled to bus 202. A digital VCR control interface 240 connects bus 202 to a digital VCR 242 for retrieving video source material and storing compressed output. A digital VCR interface 244 couples digital VCR 242 to MPEG encoder 238 to allow compression of retrieved video material. Furthermore, digital VCR interface 244 also couples digital VCR 242 to a video monitor adapter 246 to facilitate display of recorded material on a video monitor 248. MPEG-2 decoder 238 may be another source for video material for display by video monitor 248.

Video monitor 240 is used for viewing uncompressed source material and for evaluating the quality of compression results. An MPEG-2encoder 238 performs the encoding in accordance with the developed encoding plan. MPEG-2 decoder 236 decodes the encoded output to facilitate picture quality evaluation.

Many other devices or subsystems (not shown) may be connected in a similar manner. Also, it is not necessary for all of the devices shown in FIG. 2 to be present to practice the present invention, as discussed below. The devices and subsystems may be interconnected in different ways from that shown in FIG. 2. The operation of conventional computer system components such shown in FIG. 2 is readily known in the art and is not discussed in detail in this application. Code to implement the present invention may be operably disposed or stored in computer-readable storage media such as system memory 206, fixed disk 228, CD-ROM 230, or floppy disk 224.

Figure 3:
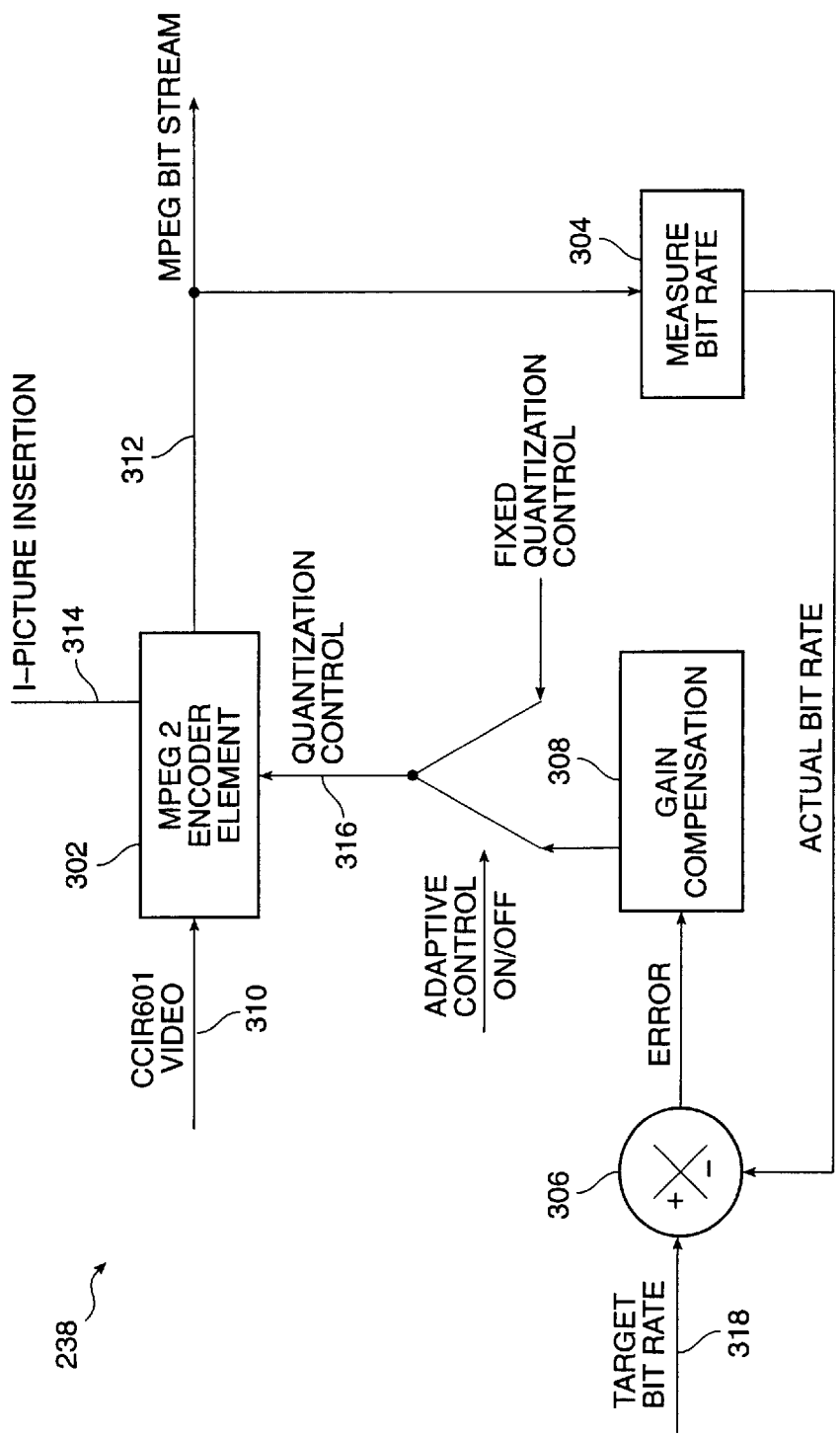
FIG. 3 depicts a simplified representation of an MPEG-2 encoding system in accordance with one embodiment of the present invention.

FIG. 3 depicts a functional representation of elements of MPEG-2 encoder 238. MPEG-2 encoder 238 is preferably implemented as a combination of a Motorola 56000 DSP IC, available from Motorola Corporation of Schaumburg, Ill., or other DSP IC, and an encoder chip set, preferably a IBM MPEG-2 Encoder, available from IBM Corporation of Armonk, N.Y..

The DSP IC (not shown) interfaces MPEG-2 encoder 238 with the system bus 202 and controls encoder operation in real-time. The encoder chip set of MPEG-2 encoder 238 functionally includes an MPEG-2 encoder element 302, a bit rate measurement unit 304, bit rate error measurement unit 306, and a bit rate compensation unit 308.

MPEG-2 encoder element 302 receives an uncompressed CCIR-601 video data stream through an input port 310. MPEG-2 encoder element 302 provides a compressed MPEG-2 output bit stream on an output port 312. An I-picture insertion input 314 to MPEG-2 encoder element 302 permits the DSP IC to force an I-picture to be inserted into the output MPEG-2 bitstream at a selected time. A quantization control input 316 to MPEG-2 encoder element 302 controls the compression ratio of MPEG-2 encoder element 302.

MPEG-2 encoder 242 may be operated in either 1) an adaptive bit rate control mode or 2) a fixed quantization mode. In the adaptive bit rate control mode, bit rate measurement unit 304, bit rate error measurement unit 306, and bit rate compensation unit 308 operate as a control loop to minimize the difference between the output bit rate of MPEG encoder element 302 and a target bit rate presented on an input 318 to bit rate error measurement unit 306. Accordingly, in the adaptive bit rate control mode, quantization control input 316 is connected to an output of bit rate compensation unit 308. In the fixed quantization mode, adaptive bit rate control is inhibited and quantization control input 316 is either left unspecified or a particular compression level is specified on quantization control input 316.

I-picture insertion control 314, target bit rate input 318, the choice of either adaptive bit rate control mode or fixed quantization control, and any selected quantization control level are all controlled by the DSP IC by writing to appropriate registers in the encoding chip set. I-picture insertion control 314 and target bit rate input 318 are controlled in real-time while video material is input to input port 310.

An encoding plan is developed separately for each subproject of video material in accordance with 1) the target average bit rate, 2) the target minimum bit rate, and 3) the target maximum bit rate specified by authoring station 102. Authoring station 102 may also assign criticality values to segments of the subproject to identify the degree of artistic motivation to maintain high picture quality in each segment. In the preferred embodiment, the encoding plan is developed by use of an iterative process that may include automatic reshaping of the profile and/or direct user reshaping of the profile. However the present invention also contemplates either a fully manual or fully automatic process using appropriate feedback control based on criteria such as the various targets and/or image quality.

Figure 4:
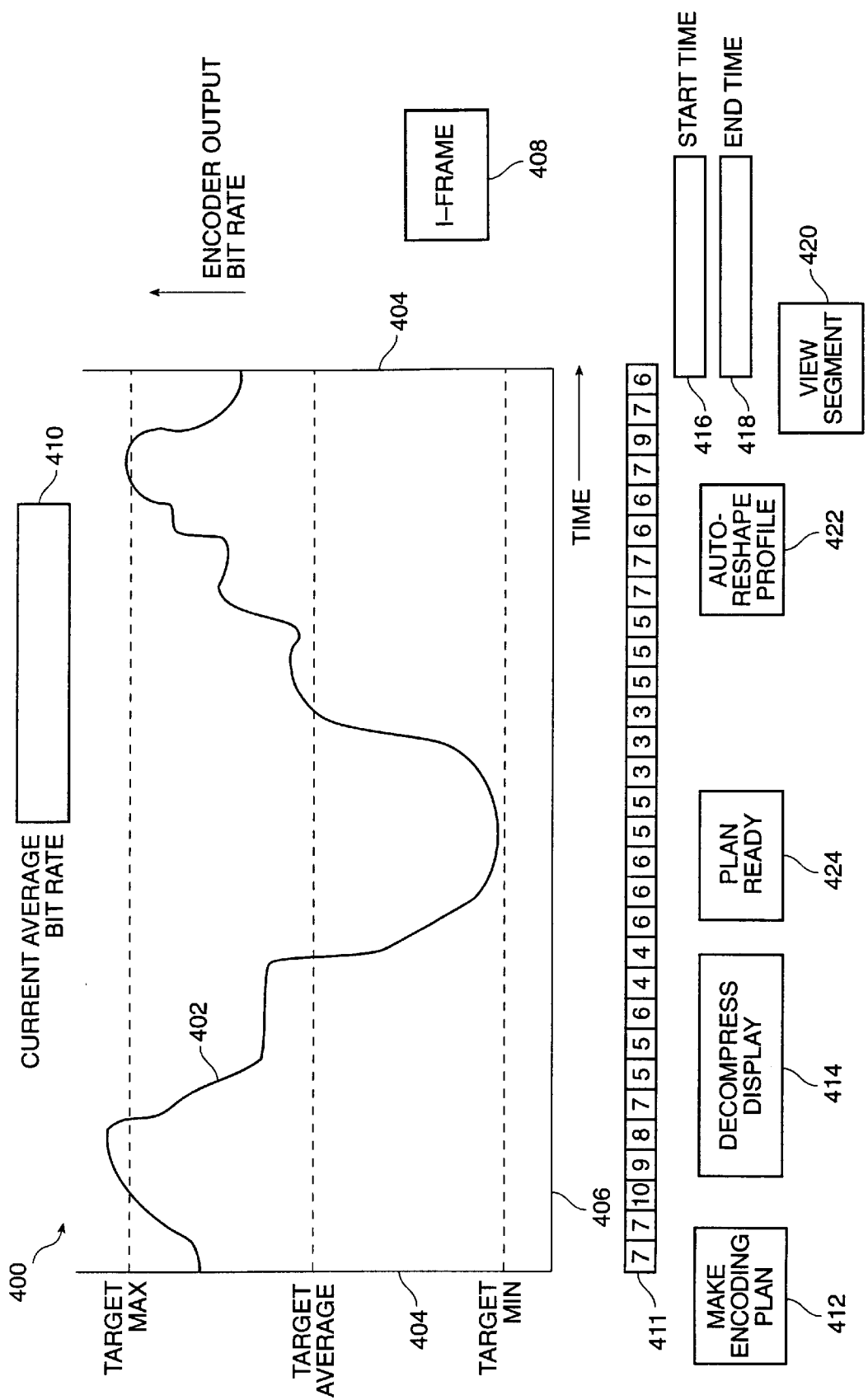
FIG. 4 depicts elements of a user interface for developing an MPEG-2 encoding plan in accordance with one embodiment of the present invention.

FIG. 4 depicts elements of a user interface screen 400 employed in this iterative reshaping process in accordance with one embodiment of the present invention. A profile 402 represents the current iteration in the reshaping process. One subproject of video material as delimited by authoring station 102 is displayed at a time. A vertical axis 404 represents output bit rate. A horizontal axis 406 represents time. Vertical axis 404 is preferably normalized so that the target maximum and target minimum are near the extremes of the drawn axis. An icon 408 may be dragged to any point along profile 402 where the user desires to force insertion of an I-picture. A field 410 shows the average bit rate for the currently displayed profile. A bar 411 shows numbers corresponding to criticality values for different segments of the profile. The values may range between 1 and 10 with higher values representing more critical periods. These values may originate with authoring station 102 or may be entered or changed within bar 411 directly.

By selecting a screen button 412, the user requests conversion of the currently displayed profile and I-picture insertion points into an encoding plan. The encoding plan preferably includes information for varying target bit rate 318 over time as well as information for controlling I-picture insertion input 314. MPEG-2 encoder 238 then applies the encoding plan to the current subproject. The encoding plan is maintained by video material preparation station 106 during the plan development process.

By selecting a screen button 414, the user requests decompression of this encoded video stream by MPEG-2 decoder 244. The decompressed video output of MPEG-2 decoder 236 is then available for display on video monitor 248. The user controls this display on video monitor 240 using a separate video playback control interface (not shown). In this way, the user may evaluate the picture quality of a particular encoding plan and assess where in the program a higher bit rate is needed or where a lower bit rate could be tolerated.

A start time field 416 and an end time field 418 allows the user to specify a limited segment for development of the encoding plan or decompression and display of video material. A screen button 420 permits the user to specify a segment of the profile for display. For a sufficiently narrow profile segment, the display would show individual pictures in thumbnail form with colored bars to denote whether the pictures are I-pictures, B-pictures or P-pictures. A screen button 422 permits the user to automatically reshape profile 402 in accordance with the target constraints and currently specified criticality values.

By selecting a screen button 424, the user indicates that all constraints are now satisfied and picture quality is satisfactory. The compressed representation of the video source material section is now ready to be sent to authoring station 102.

Figure 5:
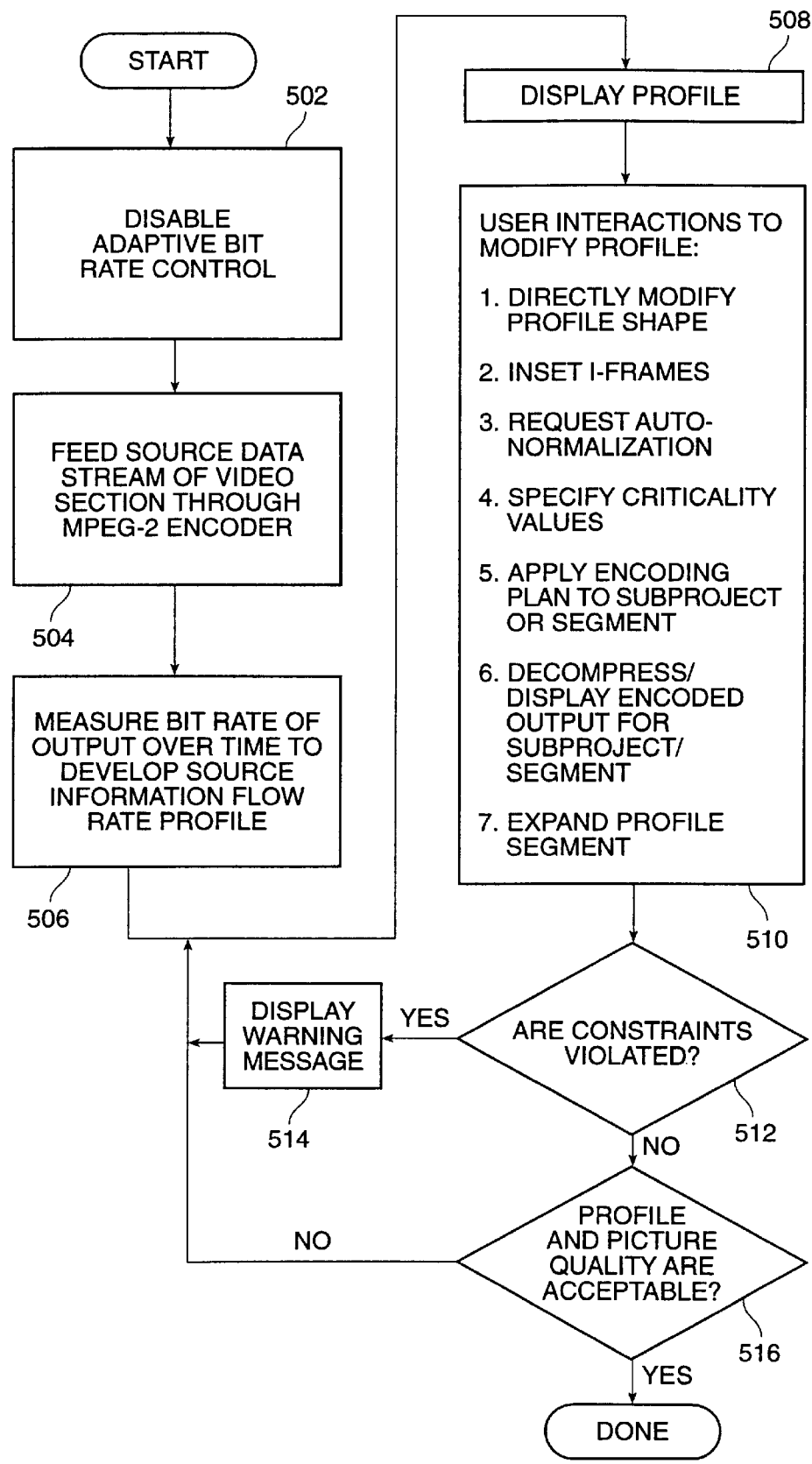
FIG. 5 is a flowchart describing steps of developing an MPEG-2 encoding plan for digital video material in accordance with one embodiment of the present invention.

FIG. 5 is a flowchart describing steps of developing an MPEG-2 encoding plan for digital video material in accordance with one embodiment of the present invention. At step 502, quantization control 316 of MPEG-2 encoder element 302 is switched to the mode where adaptive bit rate control is disabled. Then at step 504, a CCIR-601 stream of video material corresponding to a currently selected video section is fed into input port 310 of MPEG-2 encoder element 302. With adaptive bit rate control disabled and the encoder compression rate essentially fixed, the output bit rate of encoder 242 represents an estimate of the information content of the encoder input. Thus, the output bit rate will increase for visually complex scenes and for scene changes while decreasing for visually simple scenes and static scenes. At step 506, the output bit rate of MPEG-2 encoder 242 is measured over time to capture a source information flow rate profile.

At step 508, user interface display screen 210 registers and displays the profile as described in reference to FIG. 4. Step 510 represents a user interaction directed toward development or improvement of the encoding plan.

1. The user may adjust the profile shape directly using mouse 216 or some other position indicating input device at step 510. The user would drag a cursor to a particular segment of profile 402, select the segment and then drag the segment either up or down to represent a desired change of output bit rate at that point in the material. For example, if a particular segment exceeds the target maximum bit rate, the user may lower it. If picture quality is unsatisfactory for a particular segment, the user may raise this segment.

2. Alternatively, the user may also use mouse 216 to select and drag I-picture icon 408 to a position on profile 402 to force insertion of an I-picture at step 512. This will typically be done for scene changes or other critical areas as identified by high critical values on bar 411.

3. The user may request auto-normalization by activating screen button 422. This will cause the profile to be normalized to fit within the target constraints. The auto-normalization process may also take into account the criticality values displayed at step 411 by elevating the profile for segments with high criticality values and/or inserting I-pictures for segments with particularly high criticality values. Often, the user will first perform the auto-normalization procedure and then continue with manual refinement.

4. The user may specify new criticality values in bar 411 to affect the auto-normalization process initiated with screen button 422.

5. The profile as displayed in conjunction with any specified I-picture insertion points represents an encoding plan. By activating screen button 412, the user applies the encoding plan to the video segment specified by start time field 416 and end time field 418. MPEG encoder 238 is switched back into the adaptive bit rate control mode. Target bit rate control input 318 is controlled in real-time in accordance with the displayed profile. I-picture insertion control input 314 is activated at the previously specified insertion points.

6. By activating screen button 414, the user may decompress and display any previously compressed program segment as defined by fields 416 and 418. This helps the user assess the quality of previously compressed program material.

7. The user may choose to display only a segment of profile 402 as indicated by start time field 416 and end time field 418 by activating screen button 420.

At step 512, video material preparation station 106 determines if profile 402 as reshaped at step 510 in fact meets the target constraints. The user may have reshaped the profile so that it does not meet target constraints. If the target constraints are violated, processing continues at step 514 where a warning message is displayed. The warning message states which constraint is now violated and by how much. After the warning message, processing returns to step 508.

Step 516 represents the user's decision to terminate the encoding plan development process. If picture quality is satisfactory, the user activates screen button 424 and the encoding plan identified by profile 402 and the specified I-picture insertion points is sent to authoring station 102. If picture quality is not satisfactory, processing continues at step 508. The process of bringing the profile into conformance while maintaining adequate picture quality may include multiple iterations through step 510.

The invention has now been explained with reference to specific embodiments. Other embodiments will be apparent to those of ordinary skill in the art in view of the foregoing description. For example, the present invention is not limited to MPEG-2 or video data. It is therefore not intended that this invention be limited except as indicated by the appended claims.

What is claimed is:

1. A computer-implemented method for establishing a digital data encoding plan for digital information wherein a source data stream has inherently variable information flow rate and wherein a target encoding scheme for said source data stream has a variable compression control and a variable output bit rate, said method comprising the steps of:

capturing a profile of said variable information flow rate over time; and conforming said variable information flow rate profile to a set of time-dependent target constraints upon said variable output bit rate; and wherein said capturing step comprises the substeps of:

feeding said source data stream into an encoder operating in accordance with said target encoding scheme, said encoder having an adaptive bit rate control input;

disabling said adaptive bit rate control input; and registering the contour of said output bit rate of said encoder to define said variable information flow rate profile.

2. The method of claim 1 wherein said set of target constraints comprises a target maximum bit rate, a target minimum bit rate, and a target average bit rate.

3. The method of claim 1 wherein said source data stream comprises a video data stream.

4. The method of claim 3 wherein said target encoding scheme is MPEG-2.

5. The method of claim 4 wherein said conforming step comprises the substeps of:

displaying said captured profile; and reshaping at least a segment of said profile to develop a user reshaped profile.

6. The method of claim 5 wherein said reshaping substep comprises:

specifying insertion of an I-picture at a particular time in said source data stream.

7. A computer-implemented method for establishing a digital data encoding plan for digital information wherein a source data stream has inherently variable information flow rate and wherein a target encoding scheme for said source data stream has a variable compression control and a variable output bit rate, said method comprising the steps of:

capturing a profile of said variable information flow rate over time;

conforming said variable information flow rate profile to a set of time-dependent target constraints upon said variable output bit rate;

displaying said captured profile on a display; and reshaping at least a segment of said captured profile to form a reshaped profile.

8. The method of claim 7 further comprising the step of:

encoding at least a segment of said source data stream in accordance with said reshaped profile.

9. The method of claim 7 wherein said reshaping step comprises:

accepting user input directly reshaping said at least a segment of said captured profile.

10. The method of claim 9 wherein said reshaping step comprises:

automatically normalizing said captured profile in accordance with said target constraints.

11. Apparatus for establishing a digital data encoding plan for digital information wherein a source data stream has inherently variable information flow rate and wherein a target encoding scheme for said source data stream has a variable compression control and a variable output bit rate, said apparatus comprising:

means for capturing a profile of said variable information flow rate over time; and means for conforming said variable information flow rate profile to a set of time-dependent target constraints upon said variable output bit rate; and wherein said capturing means comprises:

means for feeding said source data stream into an encoder operating in accordance with said target encoding scheme, said encoder having an adaptive bit rate control input; means for disabling said adaptive bit rate control input; and means for registering the contour of said output bit rate of said encoder to define said variable information flow rate profile.

12. The apparatus of claim 11 wherein said set of target constraints comprises a target maximum bit rate, a target minimum bit rate, and a target average bit rate.

13. The apparatus of claim 11 wherein said source data stream comprises a video data stream.

14. The apparatus of claim 13 wherein said target encoding scheme is MPEG-2.

15. The apparatus of claim 14 wherein said conforming means comprises:

means for displaying said captured profile; and means for reshaping at least a segment of said profile to develop a user reshaped profile.

16. The apparatus of claim 15 wherein said reshaping means comprises:

means for specifying insertion of an I-picture at a particular time in said source data stream.

17. Apparatus for establishing a digital data encoding plan for digital information wherein a source data stream has inherently variable information flow rate and wherein a target encoding scheme for said source data stream has a variable compression control and a variable output bit rate, said apparatus comprising:

means for capturing a profile of said variable information flow rate over time;

means for conforming said variable information flow rate profile to a set of time-dependent target constraints upon said variable output bit rate;

means for displaying said captured profile; and means for reshaping at least a segment of said captured profile to form a reshaped profile.

18. The apparatus of claim 17 further comprising:

means for encoding at least a segment of said source data stream in accordance with said reshaped profile.

19. The apparatus of claim 17 wherein said reshaping means comprises:

means for accepting user input directly reshaping said at least a segment of said captured profile.

20. The apparatus of claim 19 wherein said reshaping means comprises:

means for automatically normalizing said captured profile in accordance with said target constraints.

21. A computer system configured to establish a digital data encoding plan for digital information wherein a source data stream has inherently variable information flow rate and wherein a target encoding scheme for said source data stream has a variable compression control and a variable output bit rate, said computer system comprising:

a display; and a processing system configured to:

develop a profile of said variable information flow rate over time;

display said profile on a display; and to conform said variable information flow rate profile to a constrained target profile of said variable output bit rate.

22. The computer system of claim 21 wherein said processing system is configured to develop said profile by virtue of being configured to:

feed said source data stream into an encoder operating in accordance with said target encoding scheme and having an adaptive bit rate control input;

disable said adaptive bit rate control input; and to monitor an output bit rate of said encoder.

23. The computer system of claim 22 wherein said source data stream comprises video information.

24. The computer system of claim 21 wherein said processing system is configured to conform said profile by virtue of being configured to:

accept user input reshaping a segment of said profile to develop a user reshaped profile.

* * * * *